United States Patent [19]

Suessegger et al.

[11] Patent Number: 5,392,998
[45] Date of Patent: Feb. 28, 1995

[54] SIFTER FOR SIFTING GRANULAR MATERIAL AND GRINDING SYSTEM WITH INSERTION OF SUCH A SIFTER

[75] Inventors: Albert Suessegger, Bergisch Gladbach; Siegfried Strasser, Much, both of Germany

[73] Assignee: Kloeckner-Humboldt-Deutz AG, Cologne, Germany

[21] Appl. No.: 94,377

[22] Filed: Jul. 19, 1993

[30] Foreign Application Priority Data

Jul. 18, 1992 [DE] Germany ............... 4223762

[51] Int. Cl.⁶ .................. B02C 23/12
[52] U.S. Cl. .................. 241/79.1; 241/80; 209/143
[58] Field of Search ........... 241/79.1, 80, 81, 97; 209/134, 135, 136, 137, 142, 143

[56] References Cited

U.S. PATENT DOCUMENTS

| 2,973,094 | 2/1961 | Lundy . | |
|---|---|---|---|
| 3,329,353 | 7/1967 | Knudsen | 241/79.1 X |
| 4,357,287 | 11/1982 | Schönert . | |
| 4,418,871 | 12/1993 | Powell | 241/79.1 X |
| 4,618,415 | 10/1986 | Vecchio et al. | 241/79.1 X |
| 4,689,141 | 8/1987 | Folsberg | 241/79.1 X |
| 4,703,897 | 11/1987 | Beisner et al. . | |
| 4,993,647 | 2/1991 | Williams | 241/79.1 X |
| 5,158,182 | 10/1992 | Fischer-Helwig et al. . | |
| 5,263,652 | 11/1993 | Iwanami et al. | 241/79.1 X |

FOREIGN PATENT DOCUMENTS

| 0084383 | 6/1986 | European Pat. Off. . |
|---|---|---|
| 1005579 | 4/1952 | France . |
| 356813 | 7/1922 | Germany . |
| 3905123 | 8/1990 | Germany . |
| 3915432 | 11/1990 | Germany . |
| 3920005 | 1/1991 | Germany . |
| 4042227 | 7/1992 | Germany . |
| 1034794 | 8/1983 | U.S.S.R. . |

*Primary Examiner*—Timothy V. Eley
*Attorney, Agent, or Firm*—Hill, Steadman & Simpson

[57] ABSTRACT

An energy-saving effective sifter used in interparticle crushing of brittle charging stock such as cement clinker in the nip of a high pressure roller press including a dynamic sifter having a rotating rod basket and laterally preceding the rotary rod basket sifter by a fluidized bed pre-sifting chamber having an admission opening at the top with a chamber defined between opposed porous walls to provide a pre-sifting zone with the walls formed by angularly adjustable baffles in one form, and passing air across the zone toward the rotary rod basket, removing a coarse grain fraction below the pre-sifting chamber, removing a medium grain fraction from beneath the rotary rod basket and removing fine material axially of the rotary rod basket passing the medium grain and coarse grain fraction into an interparticle crushing high pressure roller press having a nip pressure in excess of 2 t/cm of roller length, mixing the medium grain fraction and coarse grain fraction with a pre-comminuted pulverulent material such as cement clinker, passing the discharge of the interparticle crushing roller press to a deagglomerator and feeding the deagglomerated material into the sifted. In one form, the fine material rod basket is passed through a dust removal cyclone with the discharge of the cyclone and the medium grain discharge of the rod basket being passed to a tube mill.

13 Claims, 3 Drawing Sheets

SIFTER FOR SIFTING GRANULAR MATERIAL AND GRINDING SYSTEM WITH INSERTION OF SUCH A SIFTER

BACKGROUND OF THE INVENTION

The invention is related to improvements in sifters for sifting granular material, and more particularly to a sifter such as used in the manufacture of cement wherein material is to be separated into a coarse grain, a medium and a fine grain and the more coarse grains supplied with raw material through an interparticle crushing ball mill.

In the development of grinding systems, particularly such as used in the crushing of brittle grinding stock such as cement clinker, a unique method and apparatus has been accepted for its improved energy-saving and product production which operates under the principles sometimes known as interparticle crushing. The principles of interparticle crushing are disclosed and exemplified in European Patent 0 084 383 and in U.S. Pat. Nos. 4,357,287, Schoenert, and 4,703,897, Beisner et al.

In the preprocessing of pulverulent material, particularly when using the principles of interparticle crushing, sifters are employed to separate the pulverulent material into different fractions ranging from fine to coarse grain fractions in order to obtain optimum handling of the material for crushing and to obtain optimum uniformity and to achieve the reduction of energy required to convert the material from the brittle grinding stock nature to completed fine material such as where cement clinker is converted into finished cement.

A known sifter (U.S. Pat. No. 2,973,094) comprises a housing having two chambers in each of which a rotating rod basket provided with turbo elements is rotatably seated. A coarse grain fraction is separated in the first chamber from a material to be sifted which is introduced thereto together with the sifting airstream and a medium grain fraction is separated in the second chamber, after which the fine material contained in the material for sifting leaves the sifter together with the sifting airstream. The rotating rod baskets come into intense contact with the material for sifting when sifting the various grain fractions. It is self-evident that the rod-shaped turbo elements of the rod basket rotating in the first sifter chamber are particularly subject to high wear as a consequence of the impact contact by the coarse grains of material. This is even more the situation when the material to be sifted in the sifter is the discharged material of a high-pressure interparticle crushing roller press. The energy-saving interparticle crushing of brittle grinding stock is disclosed, for example, for cement clinker in European Patent 0 084 383 and U.S. Pat. No. 4,357,287. In interparticle crushing, namely, the individual particles of the grinding stock drawn in the nip by friction are mutually crushed in a product bed, i.e. in a material fill compressed between the two roller surfaces of the roller press with the application of an extremely high pressure, and are pressed to form agglomerates of material, what are referred to as scabs. These are composed of material grains having a comparatively sharp-edge grain surface which highly intensify the wear of a following sifter, particularly when the latter is a dynamic sifter having at least one rotating rod basket.

An object of the invention is to create a simply constructed sifter that is suitable for being utilized in a circulating grinding system with a high-pressure interparticle crushing roller press, whereby the sifter is a dynamic sifter having at least one rotating rod basket that, however, is nonetheless not subject to high wear.

A further object of the invention is to provide an improved sifter structure which is capable of improved sifting operation and in particular removes coarse grain fraction material before such material can engage the rotary sifter.

A further object of the invention is to provide an improved arrangement constituting a sifter arrangement in combination with an interparticle crushing roller press which is capable of sifting and pressing the material in an improved sequence such that an improved more uniform product results and improved energy-saving results with a reduction in wear of the equipment.

FEATURE OF THE INVENTION

A characteristic of the sifter of the invention is that it includes a rotary sifter laterally preceded by a shaft-shaped fluidized bed pre-sifting chamber that comprises an admission opening at the top for the material to be sifted, comprises a discharge opening at the bottom for a coarse grain fraction that has been sifted out and comprises two pre-sifting zone defining walls forming a pre-sifting zone between them and laterally conduct sifting air. A turbo air or rotary sifter having at least one rotating rod basket is directly connected to a laterally attached cross-flow air sifter. The pre-sifting zone deviates slightly from the vertical, and a coarse grain fraction is separated from the material for sifting. This coarse grain fraction does not come into contact at all with the rotating rod basket which is especially susceptible to wear. In a circulating grinding system having a high-pressure interparticle crushing roller press preceding the sifter of the invention, the coarse grain fraction, separated off in the pre-sifting chamber of the sifter, is advantageously recirculated into the material charging stack of the high-pressure roller press into which the fresh grinding stock is also delivered. The medium grain fraction withdrawn from the sifter in the region under the rotating rod basket can be advantageously introduced into a tube mill or ball mill and be ground therein to finished product fineness. The finished product itself is withdrawn from the sifter together with the sifting airstream at at least one of the axial end faces of the rotating rod basket and is separated from the sifter airstream in a de-dusting means.

Other objects, advantages and features of the invention will become more apparent to those versed in the art, as well as the equivalent structures and methods which are to be covered herein, in the teaching of the principles of the invention in connection with the disclosure of the preferred embodiments thereof in the specification, claims and drawings, in which:

DESCRIPTION OF THE PREFERRED EMBODIMENTS

Figure 1:
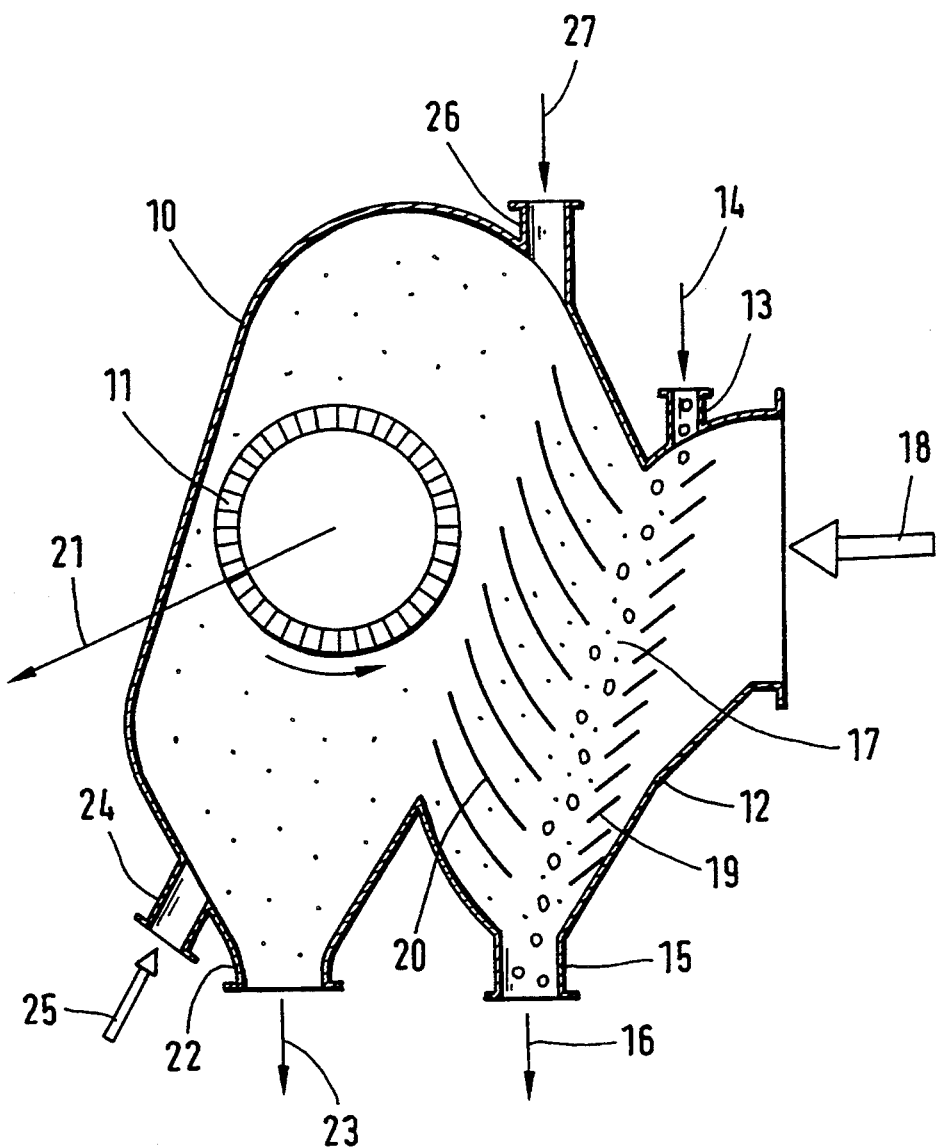
FIG. 1 is a schematic vertical sectional view taken through a sifter of the invention illustrating the rotating rod basket and the pre-sifting chamber.

The sifter of FIG. 1 comprises a housing 10 in whose left-hand part at least one rod basket 11 is rotatably arranged, the basket carrying rod-shaped turbo elements arranged distributed over the rotor circumference. In the exemplary embodiment, the rotor shaft of the rotating rod basket 11 is arranged horizontally disposed. The rotor shaft, however, can also assume a different attitude in the sifter housing 10. A rotary drive of the rotor shaft of the rod basket 11 is provided but is omitted from being shown in FIG. 1. The sifter is laterally preceded by a shaft-shaped fluidized bed pre-sifting chamber 12 that comprises an admission opening 13 at the top for the material 14 to be sifted and a discharge opening 15 at the bottom for a coarse grain fraction 16 that has been sifted out. The pre-sifting chamber includes baffle walls forming a pre-sifting zone 17 between them that are porous or are transmissive for lateral flow of the sifting air 18. These walls of the fluidized bed pre-sifting chamber 12 that are transmissive for the sifting air comprise louver-like baffles 19 and 20 directed obliquely down in the direction of the discharge opening 15 for the coarse grain fraction 16 that has been sifted out. These louver-like baffles are capable of being adjusted as to their slope. The pre-sifting zone 17 lying therebetween is arranged obliquely disposed at a small angle deviating from the vertical.

The material 14 for sifting slides from top to bottom over the louver-like baffles 19 and can thus be kept as a fluidized bed and can be optimally set by air flow and baffle angle such that the coarse grain fraction 16, for example larger than 0.5 mm having sharp-edge grain surfaces is in fact separated out in the pre-sifting zone 17 on the basis of cross-stream sifting.

The rotating parts of the sifter of the invention no longer come into contact with this coarse grain fraction, so that the sifter is no longer susceptible to wear as a result thereof. Perforated plates can also be utilized instead of the louver-like baffles 19 or 20, or both.

The sifting air-transmissive walls including the louver-like baffles 19 can be in communication with a vibratory generator for a better distribution and/or deagglomeration of the material 14 for sifting.

The stream of sifting air and fine material, illustrated by the arrow 21, is withdrawn via at least one of the two end faces of the rotating rod basket 11 and is conducted to a de-dusting means for the purpose of separating the fine finished product, as shall be set forth below with reference to FIGS. 2 and 3. According to FIG. 1, the sifter housing 10 comprises a discharge opening 22 in a region below the at least one rotatably arranged rod basket 11 for discharging a medium grain fraction 23, i.e. grits having a grain size of, for example, less that 0.5 mm. For controlling the fineness of the medium grain fraction 23, the sifter housing 10 can comprise an admission opening 24 in roughly its lower region through which a secondary airstream 25 is introduced into the sifter. Moreover, the sifter housing 10 can also comprise an admission opening 26 in the region above the rod basket 11 for delivering a secondary material 27 that is already fine-grained. This fine-grained secondary material 27, for example, can be an additive such as finely ground silica sand, gypsum, etc. that is added to the primary grinding stock 14.

Figure 2:
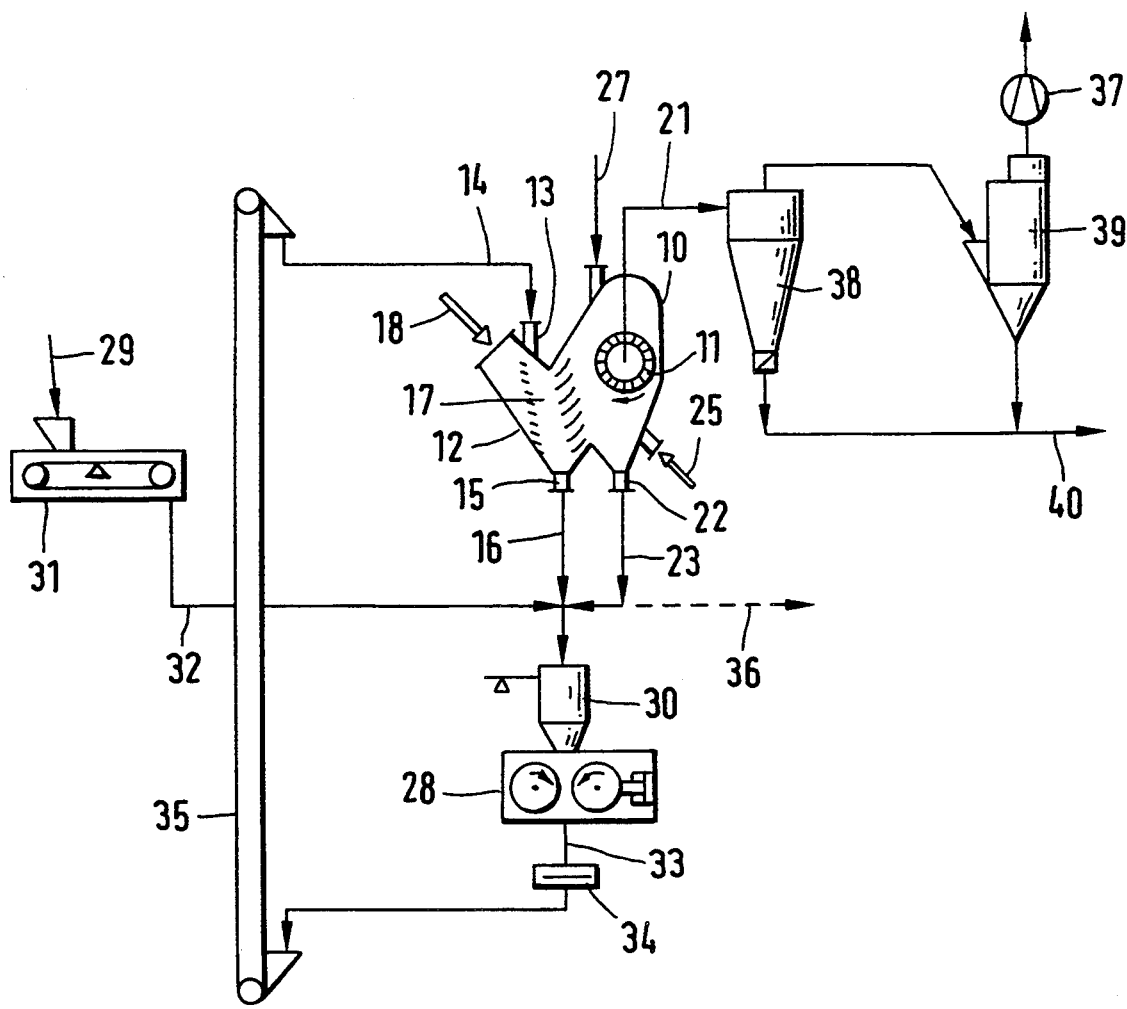
FIG. 2 is a somewhat schematic showing of a grinding system embodying the structure of FIG. 1 and including the interparticle crushing roller mill.

According to FIG. 2, the sifter of FIG. 1, shown merely rotated by 180°, is inserted into a circulating grinding system with a high-pressure roller press. The discharge opening 15 of the sifter for the coarse grain fraction 16 is in communication with the product delivery stack 30 of a high-pressure roller press 28 that accepts fresh material 29. The fresh material 29 to be comminuted, for example non-precomminuted cement clinker having a grain size up to, for example, 100 mm, is thereby introduced into the delivery stack 30 of the high-pressure roller press 28 via a metering means 31 and conveyor 32. The grain size of a substantial portion of the fresh charging stock 29 is larger than the width of the narrowest gap of, for example, 20 mm between the two pressing rollers that can have a diameter of, for example, 900 mm. The pressing power of the rollers of the roller press 28 pressing on the product amounts to more than 2 t/cm of roller length, for example 6 through 9 t/cm. The charging stock is comminuted in the nip between the rollers by a combined individual grain comminution and interparticle crushing. For the implementation of this latter comminution principle, the charging stock is supplied to a delivery stack 30 of the roller press 28 in such a great quantity that the material to be comminuted, and that is drawn in between the rollers by a friction, presses the rollers apart and the particles of the charging stock mutually crush one another in the nip in a collective or in a product bed. The cement clinker emerges from the nip comminuted and partially agglomerated, i.e. pressed into scabs 33, whose proportion of particles already reduced to the desired cement fineness can already be relatively high, for example 25% smaller than 90 $\mu$m.

The scabs 33 are broken up in a deagglomerator 34 and are introduced via a conveyor 35 into the admission opening 13 of the fluidized bed pre-sifting chamber 12 of the sifter 10 as primary charging stock 14. The coarse grain fraction 16 separated in the sifter is introduced into the product delivery stack 30 of the high-pressure roller press 28 together with the fresh material 29. The draw-in conditions for the overall charging stock are improved in the nip of the roller press 28 due to the mixture of fresh material and recirculated coarse material 16. The medium grain fraction 23 withdrawn from the sifter can likewise be recirculated into the product delivery stack 30 of the roller press 28 and/or can be taken from the grinding system as a finished product 36 having medium fineness. The stream 21 of sifting air and fine product withdrawn from the rotating rod basket 11 at its end face is drawn by an induced draught blower 37 through a dust cyclone 38 and then through a dust filter 39 and the fine material separated off leaves the grinding system as finished product 40.

Figure 3:
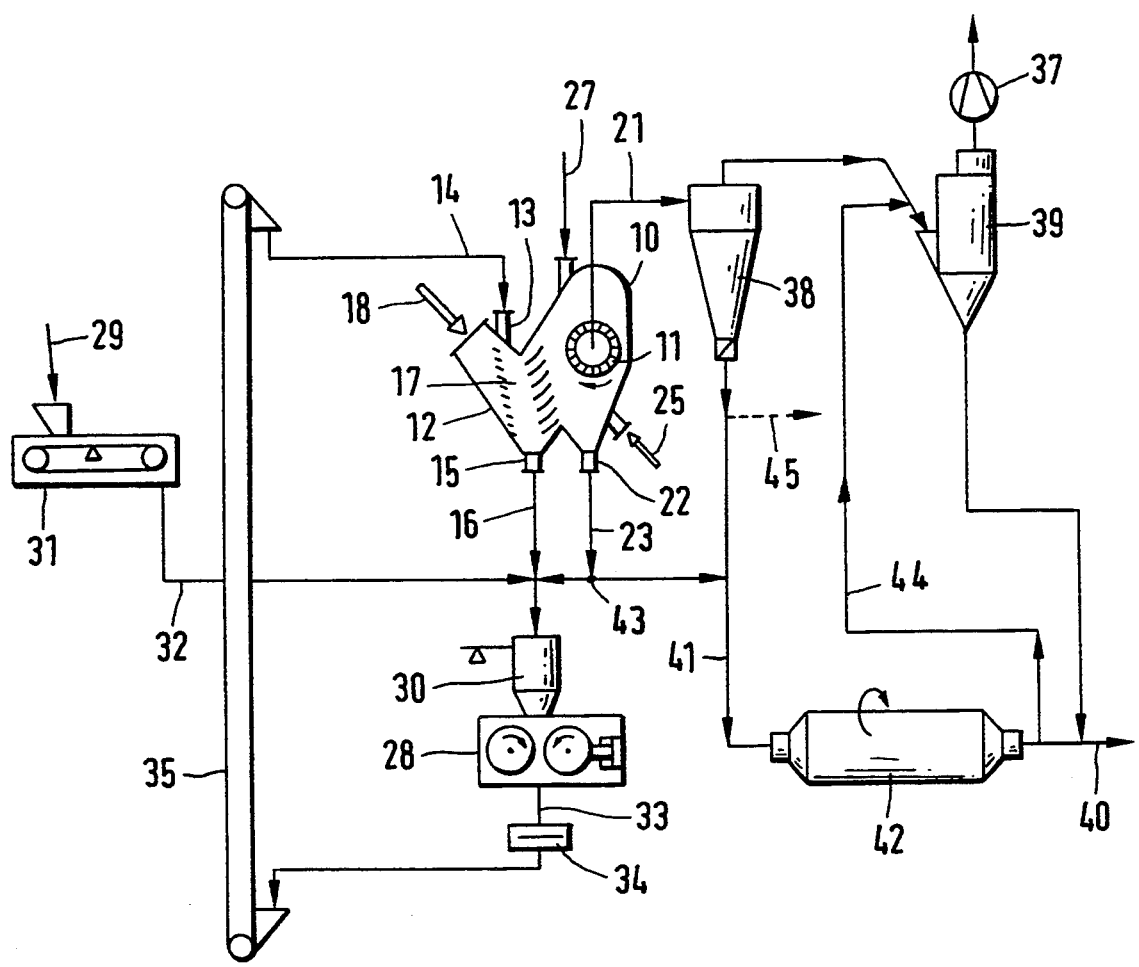
FIG. 3 is a somewhat schematic showing similar to FIG. 2 but illustrating a modified form thereof.

In the grinding system of FIG. 3, which conforms to the grinding system of FIG. 2 except for an addition. The discharge opening 22 of the sifter 10 for discharging the medium grain fraction 23 is connected via a connecting conduit 41 to the product admission of a tube or ball mill 42. A divider for the product quantity can be arranged at the location 43, this divider supplying either the entire quantity or only a partial quantity of the medium grain fraction 23 taken from the sifter 10 to the tube mill 42. The tube mill 42 can be de-dusted via the de-dusting conduit 44 with a connection to induced draft blower 37. The removal of a finished product sub-stream would also be possible at the location 45. The product 40 can also be additionally conducted via a separate sifter that is not shown in FIG. 3.

In a version of the grinding system circulation shown specifically in FIG. 3, the material 27 can also be the discharged material 40 of the tube mill 42. In this circulation, the material withdrawal 45 is then the withdrawal of the finished product.

While handling extremely high throughput powers (t/h), the dynamic sifter of the invention can also be advantageously equipped with a plurality of rod baskets arranged side-by-side instead of being equipped with one rod basket 11. A hot gas can also be utilized as drying gas given damp fresh material instead of standard sifting air 18 and that air recirculated from the induced draft blower 37, mill de-dusting air, etc., can be utilized as sifting air 18. Given hot fresh material, cold sifting air can be utilized for the purpose of cooling the material to be sifted.

We claim as our invention:

1. A circulating grinding system comprising in combination a sifter for sifting granular material and a high pressure roller press, said sifter comprising in combination:
    a rotary rod basket having circumferentially spaced axially extending turbo elements for the admission and discharge of airborne coarse and fine materials to be sifted with fine material proceeding axially from the rod basket and a medium grain fraction being discharged downwardly from the rod basket;
    a fluidized bed pre-sifting chamber laterally of the rod basket having a top entry for admitting the material to be sifted and a lower discharge for coarse fraction material;
    said chamber having opposed porous walls defining a pre-sifting zone between them and transmitting air through the walls across said zone;
    and air admission means for directing a flow of air through said walls across said zone toward the rod basket whereby the coarse fraction material is removed in the pre-sifting chamber and does not come into contact with the rod basket; and
    said high roller press being capable of interparticle comminution including opposed pressing rollers having a nip pressure in excess of 2 t/cm of roller length.

2. A circulating grindine system comprising in combination a sifter for sifting granular material and a tube mill, said sifter comprising in combination:
    a rotary rod basket having circumferentially spaced axially extending turbo elements for the admission and discharge of airborne coarse and fine materials to be sifted with fine material proceeding axially from the rod basket and a medium grain fraction being discharged downwardly from the rod basket;
    a fluidized bed pre-sifting chamber laterally of the rod basket having a top entry for admitting the material to be sifted and a lower discharge for coarse fraction material;
    said chamber having opposed porous walls defining a pre-sifting zone between them and transmitting air through the walls across said zone;
    and air admission means for directing a flow of air through said walls across said zone toward the rod basket whereby the coarse fraction material is removed in the pre-sifting chamber and does not come into contact with the rod basket; and
    said tube mill being connected to receive a discharge of medium grain fraction from the rotary rod basket.

3. A circulating grinding system comprising in combination a sifter for sifting granular material and a dust removal means, said sifter comprising in combination:
    a rotary rod basket having circumferentially spaced axially extending turbo elements for the admission and discharge of airborne coarse and fine materials to be sifted with fine material proceeding axially from the rod basket and a medium grain fraction being discharged downwardly from the rod basket;
    a fluidized bed pre-sifting chamber laterally of the rod basket having a top entry for admitting the material to be sifted and a lower discharge for coarse fraction material;
    said chamber having opposed porous walls defining a pre-sifting zone between them and transmitting air through the walls across said zone;
    and air admission means for directing a flow of air through said walls across said zone toward the rod basket whereby the coarse fraction material is removed in the pre-sifting chamber and does not come into contact with the rod basket; and
    said dust removal means is connected to receive an axial discharge from the rotating rod basket for the separation of a fine finished product.

4. A circulating grinding system including a sifter for sifting granular material and a high pressure roller press comprising in combination:
    a rotary rod basket having circumferentially spaced axially extending turbo elements for the admission and discharge of airborne coarse and fine material to be sifted with fine material proceeding axially from the rod basket and a medium grain fraction being discharged downwardly from the rod basket;
    a fluidized bed pre-sifting chamber laterally of the rod basket having a top entry for admitting material to be sifted and a lower discharge for coarse fraction material;
    said chamber having opposed porous walls defining a pre-sifting zone between them and transmitting air through the walls laterally across said zone;
    air admission means for directing a flow of air through said walls across said zone toward the rod basket whereby the coarse fraction material to be removed from the pre-sifting chamber does not come into contact with the rod basket;
    a medium grain outlet positioned below the rotary rod basket;
    said high pressure roller press being capable of interparticle crushing with nip pressure in excess of 2 t/cm of roller length;
    means connecting the medium grain discharge from the rod basket and the lower discharge from the pre-sifting chamber to an intake of the roller press;
    and means for delivering pre-comminuted material through an intake of the roller press to mix with the material from the lower discharge of the pre-sifting chamber and the medium grain fraction.

5. A sifter for sifting granular material constructed in accordance with claim 4:
    including a dust separator connected to receive an axial discharge from the rotary rod basket.

6. A sifter for sifting granular material constructed in accordance with claim 4:
    including a tube mill connected to receive discharge from the lower discharge for coarse fraction material of the pre-sifting chamber.

7. A sifter for sifting granular material comprising in combination:
    a rotary rod basket having circumferentially spaced axially extending turbo elements for the admission and discharge of airborne coarse and fine materials to be sifted with fine material proceeding axially from the rod basket and a medium grain fraction being discharged downwardly from the rod basket;

a fluidized bed pre-sifting chamber laterally of the rod basket having a top entry for admitting the material to be sifted and a lower discharge for coarse fraction material;

said chamber having opposed porous walls defining a pre-sifting zone between them and transmitting air through the walls across said zone; and air admission means for directing a flow of air through said walls across said zone toward the rod basket whereby the coarse fraction material is removed in the pre-sifting chamber and does not come into contact with the rod basket.

8. A sifter for sifting granular material constructed in accordance with claim 7:

wherein said opposed porous walls are constructed of perforated plates.

9. A sifter for sifting granular material constructed in accordance with claim 7:

wherein said opposed porous walls are constructed of louver baffles inclined obliquely downwardly in the direction of the discharge for coarse fraction material.

10. A sifter for sifting granular material constructed in accordance with claim 9:

including means for adjusting the slope of said baffles for varying their downward oblique angle relative to the slope of the material toward the discharge opening.

11. A sifter for sifting granular material constructed in accordance with claim 7:

including means defining a secondary airstream admission opening positioned below the rotary rod basket;

and a medium grain fraction opening located below the rotary rod basket.

12. A sifter for sifting granular material constructed in accordance with claim 7:

including means defining a delivery opening for the delivery of a fine grained secondary material above the rotary rod basket.

13. A sifter for sifting granular material constructed in accordance with claim 7:

including a vibratory generator in communication with the pre-sifting chamber.

* * * * *